April 27, 1948. C. W. CHAMBERLAIN Re. 22,995

METHOD AND APPARATUS FOR MOLECULAR ABSORPTION OF VIBRATION

Original Filed April 20, 1944

Inventor
Clark W. Chamberlain
By Lineaweaver and Van Antwerp
Attorneys

Reissued Apr. 27, 1948

Re. 22,995

UNITED STATES PATENT OFFICE 22,995

METHOD AND APPARATUS FOR MOLECULAR ABSORPTION OF VIBRATION

Clark W. Chamberlain, East Lansing, Mich.

Original No. 2,407,400, dated September 10, 1946, Serial No. 531,900, April 20, 1944. Application for reissue September 5, 1947, Serial No. 772,380

32 Claims. (Cl. 188—1)

This invention relates to the absorption of vibrations, impacts and of kinetic energy transmitted from one subject to another; and is more specifically concerned with vibration absorbers for frequency vibrations which are high, the molecular energy generated thereby being dissipated as heat and the heat which is generated being radiated with a speed which is equal to that of light or electric impulses, passing through surrounding or intervening solids without affecting them.

The absorption of shock and the vibrations in connection therewith has been attempted by the use of metallic springs and other absorbers constructed of organic materials which function in accordance with the "law of springs" to a greater or less degree, and which springs possess a natural period of vibration. Their use involves the danger of resonance with the period of vibration which is to be absorbed. Likewise spring absorbers capable of supporting a heavy load and subjected to repeated impacts develop fatigue and are liable to rupture or permanent deformation.

With my invention a very simple, practical and useful vibration absorber is produced operable in accordance with the "gas law" as distinguished from the "law of springs," is capable of supporting heavy loads without permanent deformation or injury and whose natural period of vibration is exceedingly high. Furthermore with my invention the vibration absorber possesses a maximum power to absorb impacts and to transmit molecular energy into kinetic energy or heat, which heat through the novel construction of my vibration absorber is rapidly and quickly disposed of without affecting the vibration absorber or damaging it in any particular.

Many other objects and purposes will be apparent upon an understanding of the invention had from the following description taken in connection with the accompanying drawing, in which, Fig. 1 is a perspective view illustrative of a purality of thin metallic sheets stacked one upon the other and which properly treated and arranged under compression provide a preferred vibration absorber construction of my invention and which form constructively a primary and essential part thereof.

Like reference characters refer to like parts in the different figures of the drawing.

Essentially with the practical production of my invention a plurality of thin sheets of metal 1 of any desired area for the purpose and burden which is to be served are located one over the other to form a pad of sheets. For convenience in handling and in manufacture instead of making the sheets separate from each other and stacking them over one another, preferably they will be formed as indicated in Fig. 2, that is, an elongated strip of metal of the desired low thickness dimension is rolled on a mandrel, the roll taken from the mandrel and forced down to flat form as shown in Fig. 2 under a very heavy pressure, in practice 3500 pounds per square inch or more, thereby providing the plurality of sheets 1 in superimposed relation to each other as shown, integrally connected at opposite edges by the bends at 2.

Figure 1:
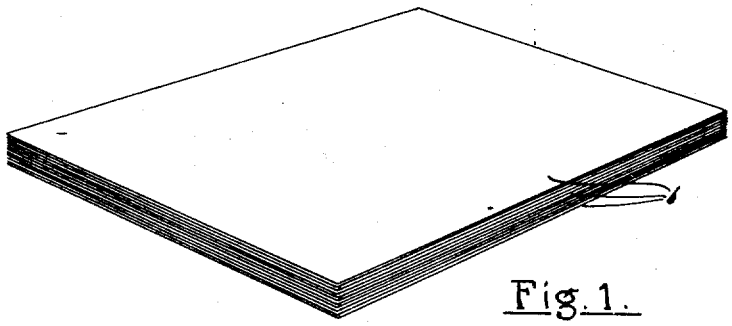
Figure 2:
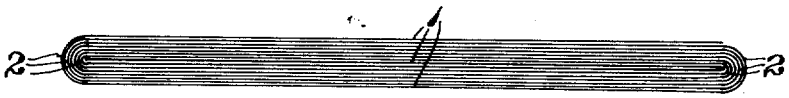
Fig. 2 is an edge view showing such plurality of sheets integrally connected at their edges by bends, that is, a pad of said sheets of thin metal has been provided from a single elongated strip rolled and then pressed flat as indicated.
Figure 3:
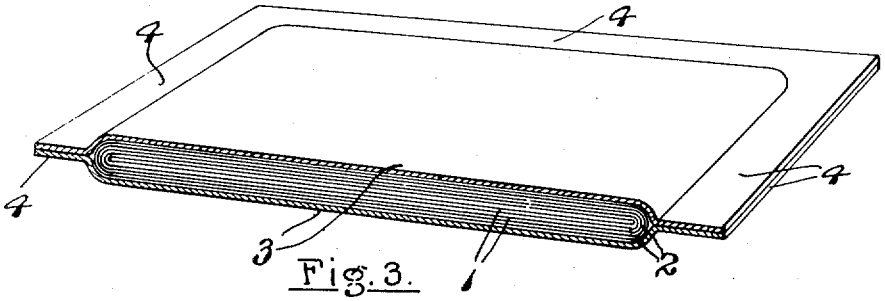
Fig. 3 is a fragmentary perspective view and transverse section through a preferable vibration absorption pad made in accordance with my invention and as it has been constructed and used in practice.

In practice and for the best results of the invention from a practical and economical standpoint the metal which may be of copper is normally .003" thick and 50 of the sheets in the pad are located one over the other either separately as in Fig. 1 or as in Fig. 2. Prior to the superimposing of the sheets over each other as in Fig. 1 or the rolling on the mandrel the surfaces of the metal are covered with an oil film, all excess oil being removed so that only such thin oil film remains as is incapable of being normally separated from the surfaces of the metal sheets to which it adheres. This oil film of liquid is of a thickness only such as is held by the molecular attraction of the surface molecules of the metal. I have discovered that the attraction of a molecule of any solid either in cohesive connection with the molecules of the like substance of such solid or in the adhesive connection of unlike liquid substances on its surfaces extends in all directions a distance of five molecules or approximately ¼ of a millionth of an inch. When oil or other liquid is applied to the surface of a metallic substance the molecular attraction exerted by the molecules of the metal to the molecules of oil being likewise to the extent of five molecules, a layer or film of oil or other liquid against all surfaces of the metal of five molecules in thickness (¼ of a millionth of an inch) is present. Care is exerted that no excess oil above this molecularly held film of oil shall be present. This can be accomplished by wiping the surface of the metal to which the oil is to be applied to remove all excess oil, as the described film of oil will not be removed by such wiping.

The unit of thin metallic plates, either unconnected at their edges or preferably integrally connected as in Fig. 2 at two opposite sides, is placed within a housing envelope of metal. In some cases the metallic housing preferably will be of copper, in other cases of steel suitably coated to resist rusting or corrosion. The housing envelope consists of two plates of identical form which are located one over the other and which at their central portions are pressed to provide recesses indicated at 3, so that the plurality of superimposed sheets of the thin metal are received between the plates with their flange portions at 4 brought into contact engagement at adjacent surfaces, this occurring under heavy pressure which may approximate 3500 pounds to the square inch or more and the flanges of the plate are welded together at their edges. As a result of the heat and temperature incident to such welding the flanges 4 and the recessed sections 3 of the envelope plates are raised to a relatively high temperature, causing air within to expand and escape from between the plates. Therefore if the welding is begun at any point of the edges of the flanges 4 and continued around until the final seal is made by completion of the welding the lowering of temperature of the metal thereafter to atmospheric temperature causes air left within to contract with a maintenance of the sheets 1 of thin metal under a pressure from the outside atmosphere maintaining said sheets 1 in pressed flat condition. Such outside atmospheric pressure however, is negligible as the major pressure is exerted by the envelope plates which are welded together while under the heavy pressure noted. The principal result obtained from a functional and operative standpoint is an elimination of any excess air.

Figure 4:
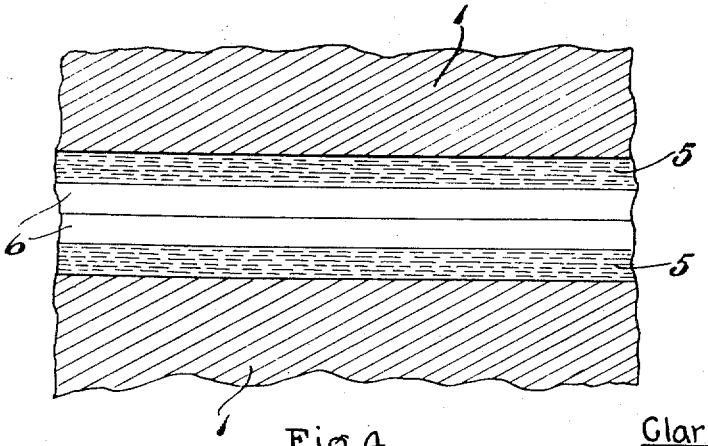
Fig. 4 is a very greatly enlarged or magnified section through two adjacent sheets illustrative of the films of liquid and air associated with and between the adjacent surfaces of the sheets.

In Fig. 4 a very highly magnified section at the surfaces of two adjacent sheets 1 of metal is shown. The film 5 is of molecules of oil, five molecules thick. Against each of the films 5 there is a second film 6 of air also five molecules thick.

The very thin films 5 of the molecules of the liquid used, held against the surfaces of the metallic plates 1 by molecular attraction are very hard, are capable of sustaining enormous pressures and are in practice impossible to remove through direct pressure. Such films have the properties of metal or similar materials in many ways as, for example, elasticity, hardness and the elastic transmission of molecular motion therewithin so that vibration caused in any manner which comes to the metal and transmitted directly through the metal by intermolecular contact is likewise transmitted through such film of liquid molecules to the gas films 6, which are of the gases composing air. The action is similar to the well known physics experiment of suspending a number of elastic balls in line contact, drawing an end ball away from the one next adjacent and letting it swing back to strike such next adjacent ball, whereupon all the intermediate balls between the end balls will remain stationary but the opposite end ball will be projected away from the ball next adjacent it approximately the same distance that the first one was drawn away from its adjacent ball.

The gaseous molecules making up the film 6 are held by molecular attraction of the molecules of the films 5. Because in gases, the molecules thereof are beyond the range of molecular attraction of adjacent gas molecules they have freedom of movement and do not, through molecular attraction, attach to themselves either like or unlike molecules. In all of these statements it is to be understood that the matter of gases, liquids and solids is considered in relation to the normal ranges of temperatures in which the vibration absorbers of my invention are used. The gases which compose air cannot be made to condense into liquid under any range of natural temperature, either at the earth's surface or as high above the surface as man has been able to go with machines, as the production of liquid air is at an exceedingly low temperature, approximating 150° below zero. The vibratory impulses imparted from the elastic films at 5 to the air films at 6 are imparted to the inelastic medium made up of the air molecules, causing very rapid motion of the molecules; and such rapid molecular motion evidences itself in high temperature. The air molecules being at high temperature radiate heat in accordance with the law of radiation, that is, in proportion to the fourth power of absolute temperature. Therefore, in practice and because of the minute amounts of air in the films 6, such molecules of air may be raised to an exceedingly high temperature or that of incandescence, the radiation is rapid, increasing in geometric progression as the temperature of the gas molecules is elevated, while the total quantity of heat in the air is not sufficient, particularly with the very rapid radiation of it, to affect the metallic plates 1 in an appreciable manner. The radiation of heat follows the laws of transmission of radiant energy, the transmission being not through the molecules of matter but around or between them or through, as has been the hypothesis of numerous physicists, the ether which is postulated to occupy interstellar spaces and the spaces between the molecules of material matter.

The vibration absorption means which I have produced, and with a plurality of the sheets or plates under pressure to squeeze out all free air between the molecularly held air films 6 are in effect, as gases confined in a cylinder under pressure of a movable piston and act in the same manner. An upper plate, as to the gas films 6 below it and above the next lower plate, is the piston, and the next lower plate the bottom of a cylinder. A gas at a temperature above its critical temperature confined in a cylinder with a movable piston, when compressed and expanded adiabatically, is alternately heated and cooled. Adiabatic heating on compression exceeds the cooling on expansion. Repeated compression and expansion causes the temperature of the confined gas to rise. On compression that portion of the gas molecules which contact the piston rebounds with increased velocities; temperature is increased. On expansion, the gas molecules contacting the receding piston rebound with decreased velocity; their temperature is decreased.

A gas confined in a cylinder with a movable piston will support a load through the action of the molecules which at any instant are moving in the direction of the piston and contact it. Momentum is transmitted to the base of the cylinder through the action of the molecules which at an instant are moving in the direction of the base and contact it. The gas molecules intervening between the piston and the base of the cylinder transmit energy by elastic collisions.

Since a gas is a poor conductor of heat, work done on the molecules contacting an approaching piston is not readily transmitted to the base of the cylinder, with the result that the layer of molecules contacting an approaching piston rise to a high temperature and are then cooled when the piston recedes. Such a gas filled cylinder with movable piston is a poor absorber of energy of vibration.

An ideal absorber is one which converts a maximum amount of vibration energy into heat and disposes of this heat at a maximum rate. Since heat is random molecular motion, the total momentum of heat is zero. An absorber of maximum efficiency is one which produces zero rebound on impact.

A gas confined in a cylinder with a movable piston will support a load equally well if the cylinder length is decreased, that is, the distance between the bottom or lower side of the piston and the upper side of the bottom of the cylinder is decreased. I have succeeded in reducing the cylinder length to a minimum. As the cylinder length approaches the mean free path of the molecules of gas, the number of collisions between gas molecules lessens and approaches zero. In a cylinder of this short length, a gas molecule contacting the approaching piston rises to a high temperature, crosses to the base of the cylinder, gives up its heat energy and returns to the piston to receive a second impact. Therefore in the vibration absorber which I have produced, there are a plurality of pistons, forty-nine in the disclosure made, and a like number of cylinders. The cylinders do not have and do not need surrounding walls to confine the gas, as the gas molecules of the films 6 are held by molecular attraction against escape and pressure does not squeeze them out. The energy of the vibrations coming to such a vibration absorber strike the first plate, pass therethrough and through its lower film 5, cause very rapid molecular motion of the freely moving gas molecules, greatly increasing their temperature, with resultant radiation and a dissipation of the energy of vibration in part into heat, with a part transmitted to the next adjacent plate or sheet of metal which operates in the same manner with relation to the air films between it and through the disclosed multiple of gas chambers, absorbs the energy of vibration and changes it into heat energy, which elevates the temperature of the gas and which gas radiates the heat, the waves of radiation moving with the speed of light through any surrounding or intervening solids without affecting them.

The present invention therefore embodies those certain and specific conditions under which a gas makes an ideal absorber of vibration and shock. Such conditions are as follows:

1. The pressure must be exceedingly high, in order to have a stability approximating that of hard metal such as steel.

2. The critical temperature of the gas used must be very low to insure against liquefaction.

3. The dimensions of the confining chamber in the direction of the applied force of vibration must be small, approximating the mean free path of the molecules of gas, since the rate of radiation of heat is as the fourth power of absolute temperature.

4. The volume of gas employed must be exceedingly small so that the work done upon it will produce a very high temperature, thus getting rapid radiation of heat produced.

The vibration absorber which I have produced secures substantially the above ideal conditions as has been proved in extensive practical use.

It is to be understood that the vibration absorber of my invention may be made in an indefinite number of sizes; and of course the number of sheets may be varied. For mounting cameras in reconnaissance planes to absorb vibration of the plane machinery or otherwise passing to the camera, they have been made as small as one square inch in surface area. Very heavy machines weighing many tons have been mounted upon vibration absorbers, the surface area of which approximates 18 square feet and for heavier machines the area would be increased. The plurality of sheets formed, preferably as in Fig. 2, may be mounted, a number of them, between upper and lower envelope plates recessed at different places to receive the superimposed sheets, so that an absorber unit thus made will have flat areas with spaced raised areas between, within which raised areas the thin sheet metal plates are located; and the flat areas have openings therethrough for bolting to foundations or supports. Such vibration absorbers are now in extensive use in mounting engines in air planes. They are also used in protecting the machinery of naval vessels from the vibration shocks of explosions, particularly those of the near miss character. They are in extensive use in mounting productive machines used in factories for absorbing the vibrations of the machines so that they will not be imparted, through finishing tools, to the work being done or to parts of the machine carrying the work. Such vibration absorbers will protect machinery against shocks and vibrations coming from without and will also absorb the vibrations of said machines to prevent the imparting thereof away from the machine, or to parts of the machine, many times with destructive effect. They may be and are used as mounts for engines and other machines, being located beneath them and are also used at the sides of machines, being pressed thereagainst for example, by screw pressure, one end of the screw against the vibration absorber which is against the machine and the other against a suitable abutment. They also are used to absorb vibrations coming to recoil springs from guns, where the period of the vibration is too fast for the spring to act in time to receive it and extend it over a larger timed interval.

It is further to be understood in connection with this invention that while the liquid film at 5 is preferably of a high grade of oil which will not congeal at very low temperatures, many other liquids theoretically at least and practically in many cases will do as substitutes. For example any metal plate exposed to the atmosphere immediately collects, through molecular attraction, a film of water vapor molecules of the same thickness as this oil film 5 and in my practice of the invention in using oil, such film of water molecules is replaced by the oil. Nevertheless the vibration absorber will operate with success if only the natural film of water vapor molecules is used and appears at the film indicated at 5 in Fig. 4.

Indeed if a completely arid air chamber was provided in which the fabrication took place, instead of the film of liquid molecules at 5 it would be replaced by a film of molecules of the gases of air of the same hardness, same impossibility to remove by pressure and the same elasticity, equivalent substantially in all respects; while the second film, indicated at 6 would be also of molecules of gases which form air but of a different character, less dense, and having the characteristics of gas so as to follow the "gas law" utilized in my invention.

It is further to be understood that the various plates or sheets 1 if held under sufficient pressure, as for example, between a foundation and a base of a machine, with the weight of the machine sufficient to produce the pressure it would operate as a vibration absorber in accordance with the same principles, though there was an elimination of the enclosing envelope. It is the superimposed metallic sheets 1 under a pressure condition which squeezes out the free air, that is the essential constructive basis of my invention. For practical convenience in manufacture, handling, shipment, installation and the like, to protect against damaging external factors and to maintain the sheets in proper relation to each other, the enclosure in the metallic envelope is very practical and effective; and in cases where the weight of the machine is too small, the envelope holds the sheets under the necessary heavy pressure.

It should also be understood that the thickness of the sheets 1 is not a matter of moment in the invention except from the practical standpoint. The sheets may be of any thickness. There is no need however for them to be greater than the thickness noted, approximately .003", except in certain cases where the absorbers are to sustain exceedingly heavy weights. I have produced the vibration absorbers as disclosed, most of them with the sheets 1 having a .003" thickness and others having a larger surface area with the maximum not over .005". But the invention is not to be limited in any sense to such very thin sheets. As a practical matter it is more economical and much less space is occupied by using the thin sheets, as they serve the purposes fully as well as if their thickness was increased.

This application is a continuation in part of my abandoned application, Ser. No. 487,674, filed May 19, 1943.

I claim:

1. A device of the class described including an enclosing envelope comprising, a lower member of metal depressed within the peripheral portions thereof to form a recess and flange portions around the recess and a similar upper member reversed with respect to and positioned over the lower member, with flange portions of the envelope members in engagement with each other and permanently secured together, and a plurality of thin sheets of metal in superimposed relation located in the recessed portions of said plates, said sheets at opposing surfaces having liquid applied thereto and with all excess liquid removed to leave a liquid film of a thickness only of the molecules of such liquid as are held by molecular attraction of the metal thereon, said envelope plates bearing against the upper and lower sheets of said plurality of sheets to place them under pressure which forces free air from between the superimposed sheets and leaves a film of air attached to and held by molecular attraction of the liquid films.

2. Shock and vibration absorbing means comprising, an assembly of chambers filled with gas at a temperature above its critical temperature, the chambers consisting of parallel metallic sheets, each having a film of oil on each flat surface thereof limited in amount to that attracted and held by molecular attraction by the molecules of said metallic sheets, and with a gas between the oil films of adjacent metallic sheets, said sheets being under pressure to force them toward each other to expel such gas as can be expelled by pressure from between the sheets.

3. A construction having the elements in combination defined in claim 2, and an enclosing rigid envelope for the plurality of sheets, said envelope being sealed against entrance and having opposite sides thereof engaging with heavy pressure against the outermost metallic sheets.

4. Shock and vibration absorbing means comprising, a rigid envelope of metal having opposing parallel sides sealed against air entrance, and a plurality of sheets of thin metal in superimposed relation formed from a single length of thin metal and with integral connections between said sheets at two opposed edges located within and between the sides of said envelope and held under compression between said sides, said sheets on all surfaces having a liquid film thereover of an amount equal only to the liquid which is held and bound against said surfaces by molecular attraction, and with free air pressed out from between the adjacent sides of said opposed sheets and with air remaining between the liquid films on adjacent sides of adjacent sheets retained against forcing out by pressure.

5. The method of producing vibration and shock absorbing devices of the character described which consists, in providing a continuous length of thin metal with a liquid film on the surfaces thereto, said length of metal having a predetermined width, and with a restriction of said liquid film to that only which is held against the surfaces of the metal by molecular attraction of the metal on the liquid, rolling said length of thin metal about a mandrel, applying heavy pressure to said roll of metal to flatten it, and enclosing the flattened roll of metal within an envelope of rigid material having opposed spaced flat sides between which said flattened material is located, and sealing the sides of said envelope while under heavy pressure applied to the outside sides thereof.

6. The method as defined in claim 5, wherein said sealing is by welding said upper and lower side members of the envelope together at and around the edges thereof, the envelope being raised in temperature and thereby expanding air therewithin to expel a portion of the air, completely sealing the envelope against air entrance while under pressure and at the high temperature produced by the welding, said envelope and flattened roll of metal therewithin cooling and reducing in temperature after said welding and sealing.

7. A device of the class described comprising a plurality of metallic sheets located in superimposed relation one over the other, said sheets having surface films of liquid thereon of a thickness equaling only the molecules of liquid which are bound and held by molecular attraction to the surfaces of said sheets, said sheets being under compression to force them toward each other and expel substantially all free air therebetween and to substantially limit the air between any two sheets to films of air composed of air molecules held by molecular attraction against said liquid films, and an enclosing envelope for said sheets having upper and lower sides engaging the upper side of the uppermost sheet and the lower side of the lowermost sheet respectively, said upper and lower sides of the envelope being connected together with said sides of the envelope bearing against the uppermost and lowermost sheets with heavy pressure.

8. A shock and vibration absorbing device comprising, an assembly of chambers filled with gas at a temperature above its critical temperature, the chambers consisting of parallel sheets, each having a film of liquid on each side surface thereof limited in amount to that attracted and held by molecular attraction by the molecules of said sheets, and with a gas between the liquid films of adjacent sheets, said sheets being under pressure to force them toward each other to expel such gas as can be expelled by pressure from between the sheets.

9. A device for absorbing and dissipating the energy of a vibrating body, comprising: a plurality of thin sheets of metal compressed to a pressure sufficient to exclude all air and liquid molecules from between the sheets except those layers of air and liquid molecules which are retained between the sheets by molecular attraction, said layers of air and liquid molecules effecting an energy absorbing and dissipating function due to vibratory movement of said molecules intitiated by vibrating impacts from said vibrating body.

10. A device as defined in claim 9, in which the liquid layers are of a thickness of approximately ¼ millionth of an inch.

11. A device as defined in claim 9, including an envelope enclosing the superimposed sheets to seal the same against the entrance of undesired foreign matter.

12. A laminated structure for absorbing shock and vibration, comprising: a plurality of superimposed sheets; a liquid film on the adjacent sides of said sheets of a thickness substantially equal to the thickness of five molecules of said liquid; and a layer of gas between said liquid films of a thickness substantially equal to twice the thickness of the liquid films.

13. A laminated structure as defined in claim 12, including a protective envelope enclosing the superimposed sheets.

14. A shock and vibration absorbing device, comprising: a plurality of superimposed sheets; a liquid film on the adjacent sides of said sheets of a thickness of approximately ¼ millionth of an inch; and a layer of gas between said liquid films of a thickness of approximately ½ millionth of an inch.

15. A device as defined in claim 14, including a protective envelope enclosing the superimposed sheets.

16. A shock and vibration absorbing device, comprising a plurality of superimposed sheets having substantially incompressible liquid and air films therebetween spacing said sheets approximately one millionth of an inch apart.

17. The method of making a shock and vibration absorbing device, which comprises the steps of: providing a plurality of sheets with a liquid film on the surfaces thereof and with a restriction of said liquid film to that only which is held against the surfaces of the metal by molecular attraction of the metal on the liquid; superimposing the sheets; and subjecting the superimposed sheets throughout the area thereof to a unit pressure sufficient to squeeze out substantially all free air from between the sheets.

18. The method of producing vibration and shock absorbing devices of the character described which comprises, providing a continuous length of thin metal with a liquid film on the surfaces thereof, said length of metal having a predetermined width, and with a restriction of said liquid film to that only which is held against the surfaces of the metal by molecular attraction of the metal on the liquid, rolling said length of thin metal about a mandrel, removing the roll of metal from said mandrel, and applying heavy pressure to the roll of metal to flatten it and to force out substantially all free air.

19. The method defined in claim 18, including the step of sealing the flattened roll of metal against contact by foreign matter.

20. The method as defined in claim 17, in which the pressure to which the sheets are subjected is not less than approximately 3500 lbs. per square inch.

21. In the method of making a shock and vibration absorbing structure, which structure comprises a plurality of superimposed sheets each having a liquid surface film of a thickness equal only to that of the molecules of liquid which are bound and held by molecular attraction to the surfaces of the sheets, the step of: subjecting the superimposed sheets to pressure sufficient to remove substantially all compressible gas from between the sheets, whereby to avoid excessive heating of the assembly in use due to successive compression and expansion of said gas.

22. The method of making a shock and vibration absorbing device, comprising the steps of: providing a plurality of sheets with a liquid surface film of a thickness and amount limited to substantially that held thereon by the force of molecular attraction of the molecules of said sheets for the molecules of said liquid film; superimposing said sheets; and subjecting the superimposed sheets to pressure sufficient to remove substantially all compressible gas from between the sheets, whereby to avoid excessive heating of the assembly in use due to successive compression and expansion of said gas.

23. In the method of making a laminated structure for absorbing shock and vibration, which structure comprises a plurality of superimposed sheets each having a liquid surface film of a thickness equal only to that of the molecules of liquid which are bound and held by molecular attraction to the surfaces of the sheets, the step of: subjecting the superimposed sheets to pressure sufficient to bring said sheets to within approximately one millionth of an inch of each other.

24. In a method of making a laminated structure for absorbing shock and vibration, the steps of: taking a plurality of plates having liquid on the surfaces thereof and reducing the liquid to films of a thickness of approximately ¼ millionth of an inch; superimposing the sheets with the stated liquid films thereon; and subjecting the superimposed sheets to sufficient pressure to squeeze out substantially all the compressible gas from between said sheets.

25. The method of producing a shock and vibration absorbing device, which comprises the steps of: providing a plurality of sheets with a liquid layer on the surfaces thereof; wiping excess liquid from said sheets to restrict said liquid to a molecular film that is held against the surfaces of the sheets by the molecular attraction of the sheets for said liquid; arranging said sheets with the stated liquid film thereon in superimposed relation; and applying sufficient pressure to said superimposed sheets to squeeze out all free air from between said sheets.

26. The method of making a vibration and shock absorbing structure, including the step of: subjecting a plurality of superimposed sheets in an arid gas chamber to a pressure sufficient to squeeze out substantially all compressible gas from between the superimposed sheets.

27. The method as defined in claim 26, including the step of: enclosing the pressed sheets in an envelope.

28. A shock and vibration absorbing device, comprising: an assembly of superimposed sheets devoid of liquid films but having substantially only incompressible gas films therebetween.

29. A shock and vibration absorbing device, comprising: an assembly of superimposed sheets devoid of liquid films but having substantially only incompressible gas films therebetween; and an envelope enclosing said assembly of sheets.

30. A laminated shock and vibration absorbing structure, comprising: an assembly of superimposed sheets devoid of liquid films but having a gaseous layer between adjacent sheets of a thickness of approximately ½ millionth of an inch.

31. A shock and vibration absorbing device comprising, an elongated strip in roll form and having superimposed convolutions arranged in substantially parallel relation, said convolutions having a liquid film on the side surfaces thereof of an amount equal only to the liquid which is held and bound against said surfaces by molecular attraction, the space between adjacent convolutions being devoid of substantially all free air.

32. A device as defined in claim 31, including an envelope enclosing the elongated strip.

CLARK W. CHAMBERLAIN.

REFERENCES CITED

The following references are of record in the file of this patent:

UNITED STATES PATENTS

| Number | Name | Date |
|---|---|---|
| 590,108 | Lewis | Sept. 14, 1897 |
| 596,280 | Short | Dec. 28, 1897 |
| 1,361,319 | Flinn | Dec. 7, 1920 |
| 1,365,291 | Stephens et al. | Jan. 11, 1921 |
| 1,625,545 | Karmazin | Apr. 19, 1927 |
| 1,648,120 | Harrison | Nov. 8, 1927 |
| 1,740,362 | Mader | Dec. 17, 1929 |
| 1,945,245 | Whyte | Jan. 30, 1934 |
| 2,196,210 | Greer | Apr. 9, 1940 |
| 2,228,779 | Panlecka | Jan. 14, 1941 |
| 2,288,855 | Steinmayer | July 7, 1942 |

FOREIGN PATENTS

| Number | Country | Date |
|---|---|---|
| 394,870 | Great Britain | July 6, 1933 |

OTHER REFERENCES

Johansson Gage Blocks and Accessories, Catalogue No. 17, June 1, 1945, pages 5 and 31. (Copy in Division 66, U. S. Patent Office.)